Feb. 29, 1944.  R. F. HLAVATY  2,342,863
SELF-ALIGNING PULLEY
Filed March 14, 1942  6 Sheets-Sheet 1
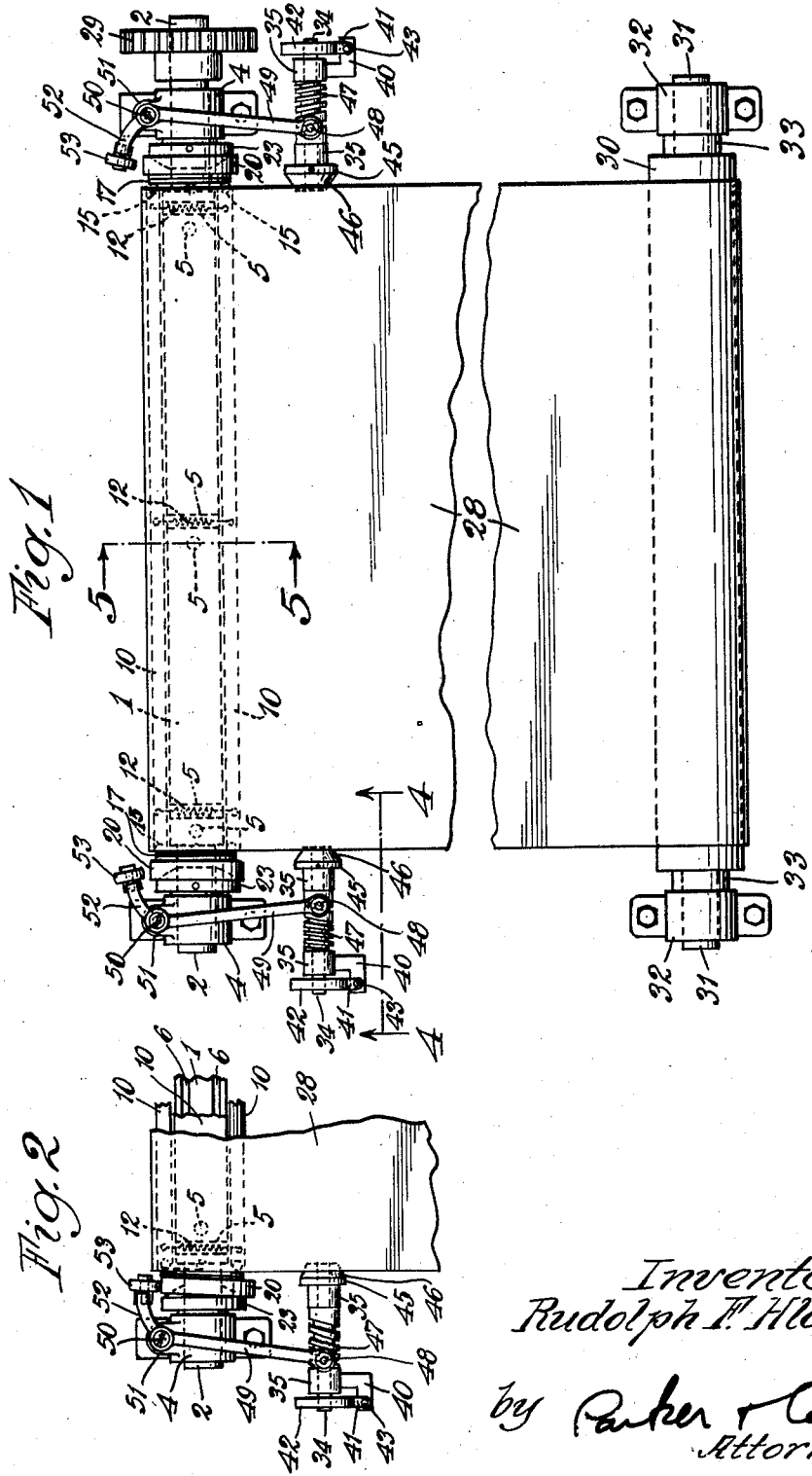
Inventor
Rudolph F. Hlavaty
by Parker & Carter
Attorneys.

Feb. 29, 1944. R. F. HLAVATY 2,342,863
SELF-ALIGNING PULLEY
Filed March 14, 1942 6 Sheets-Sheet 2
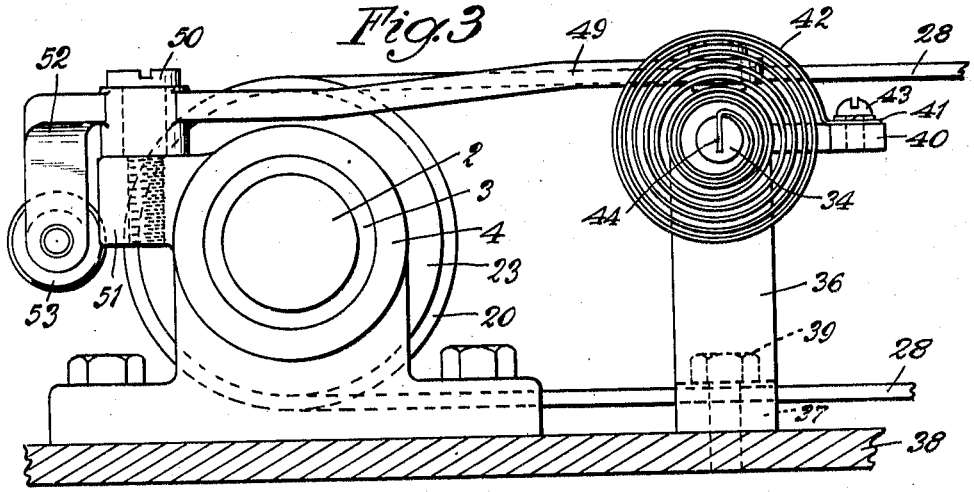
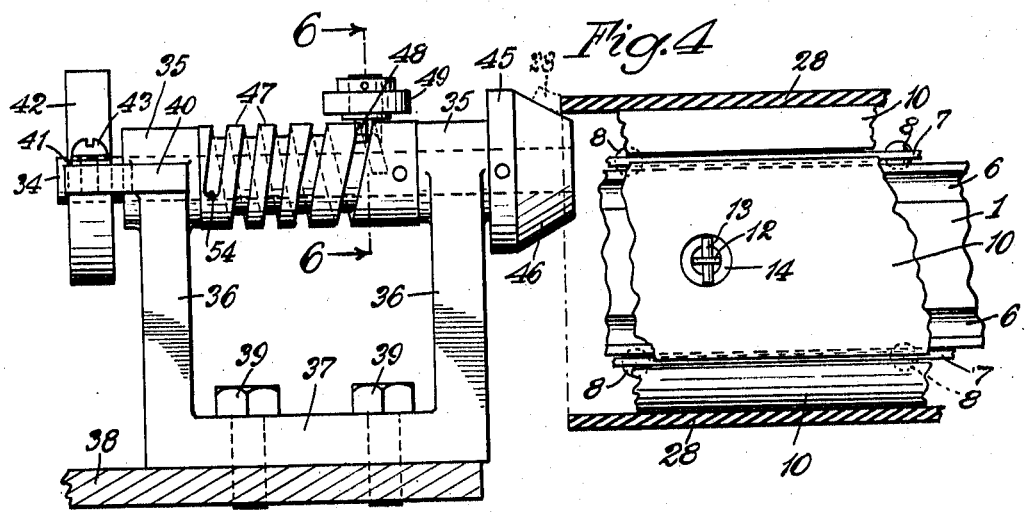
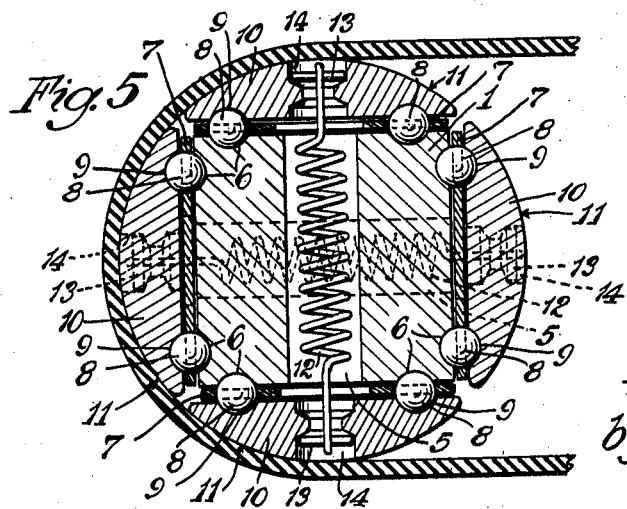
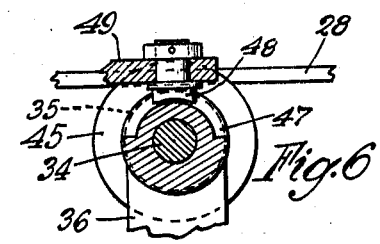
Inventor
Rudolph F. Hlavaty
by Parker & Carter
Attorneys

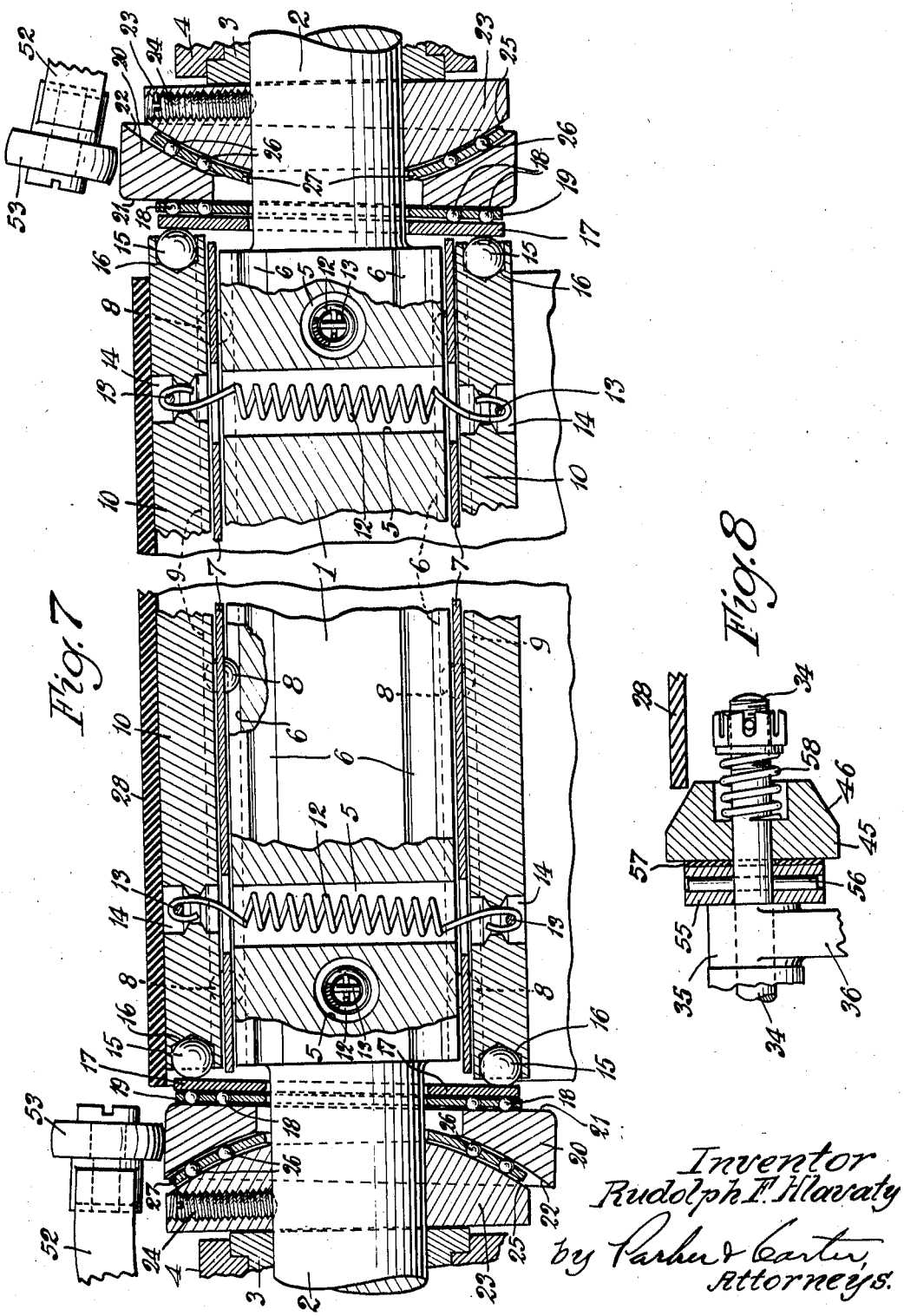

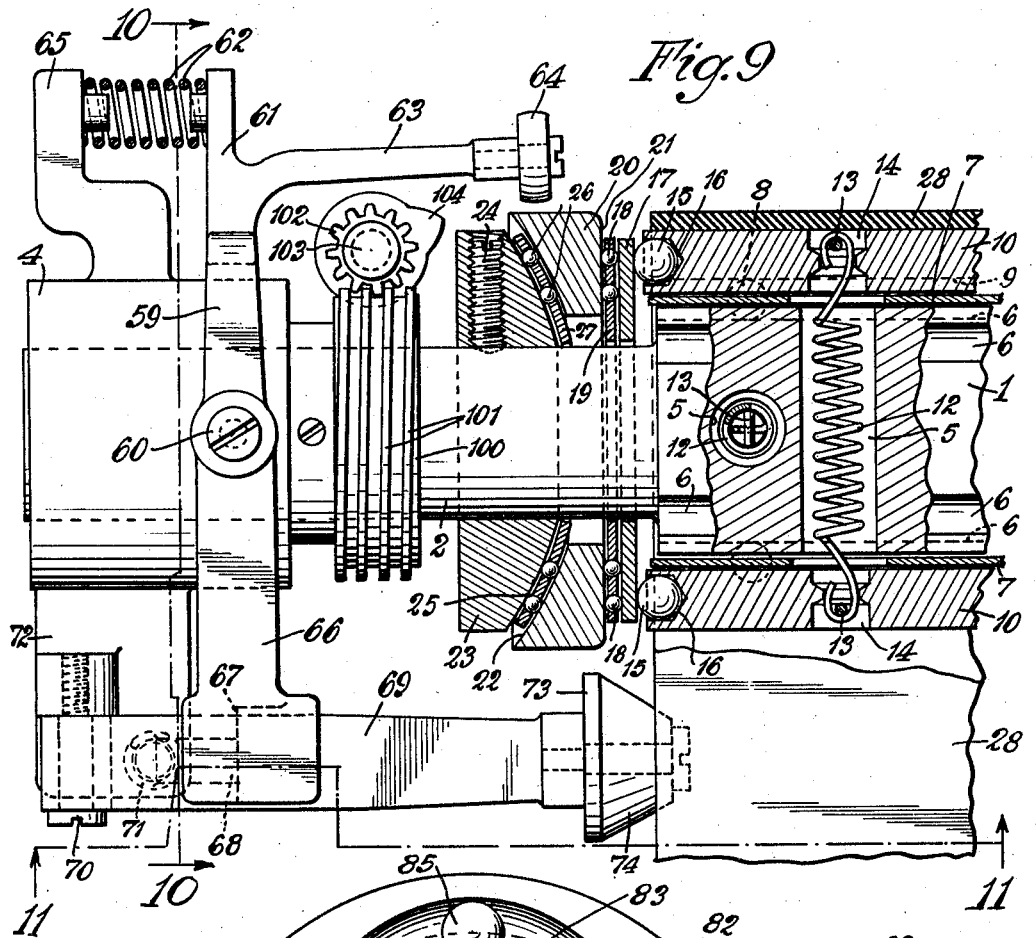

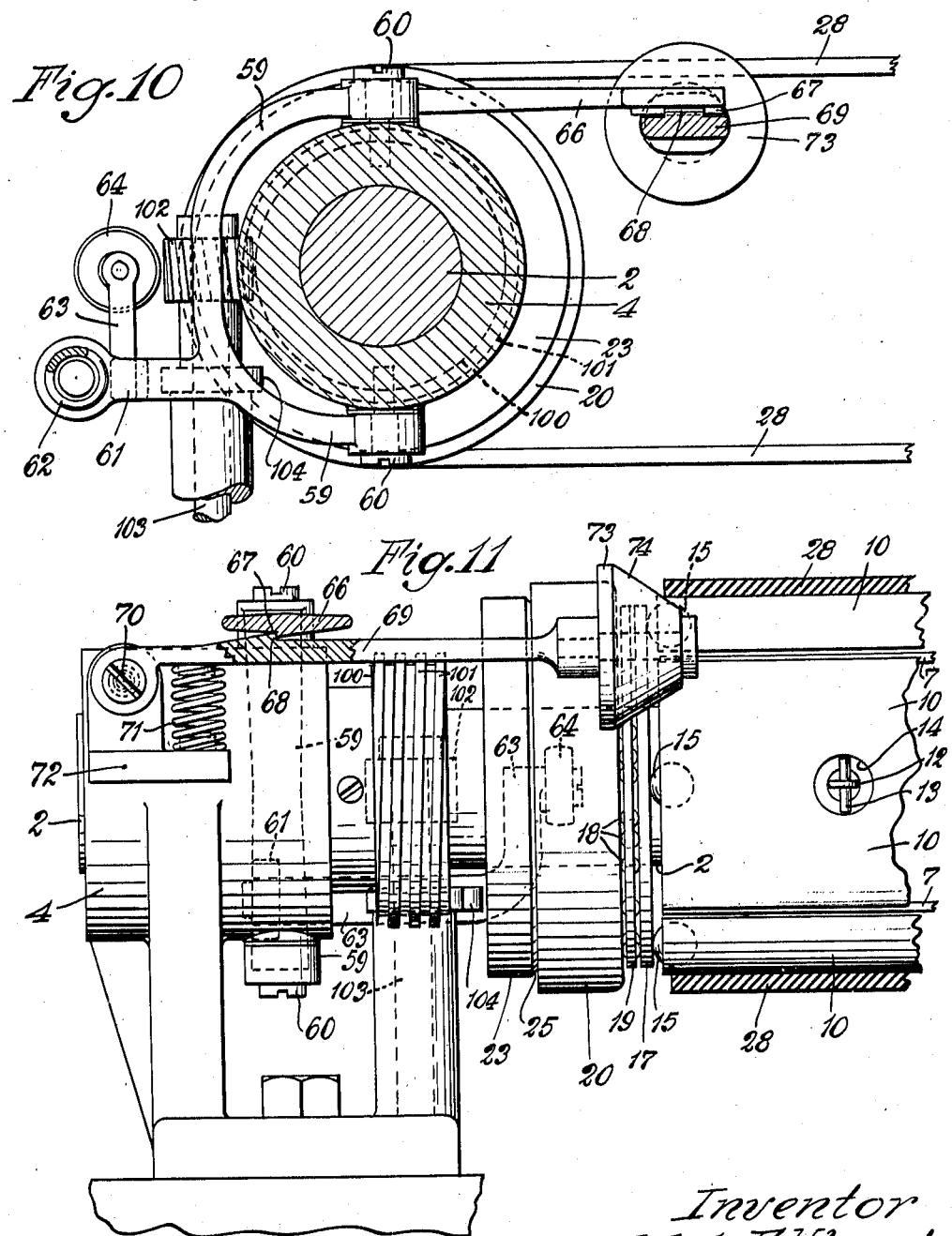

Feb. 29, 1944.    R. F. HLAVATY    2,342,863
SELF-ALIGNING PULLEY
Filed March 14, 1942    6 Sheets-Sheet 6
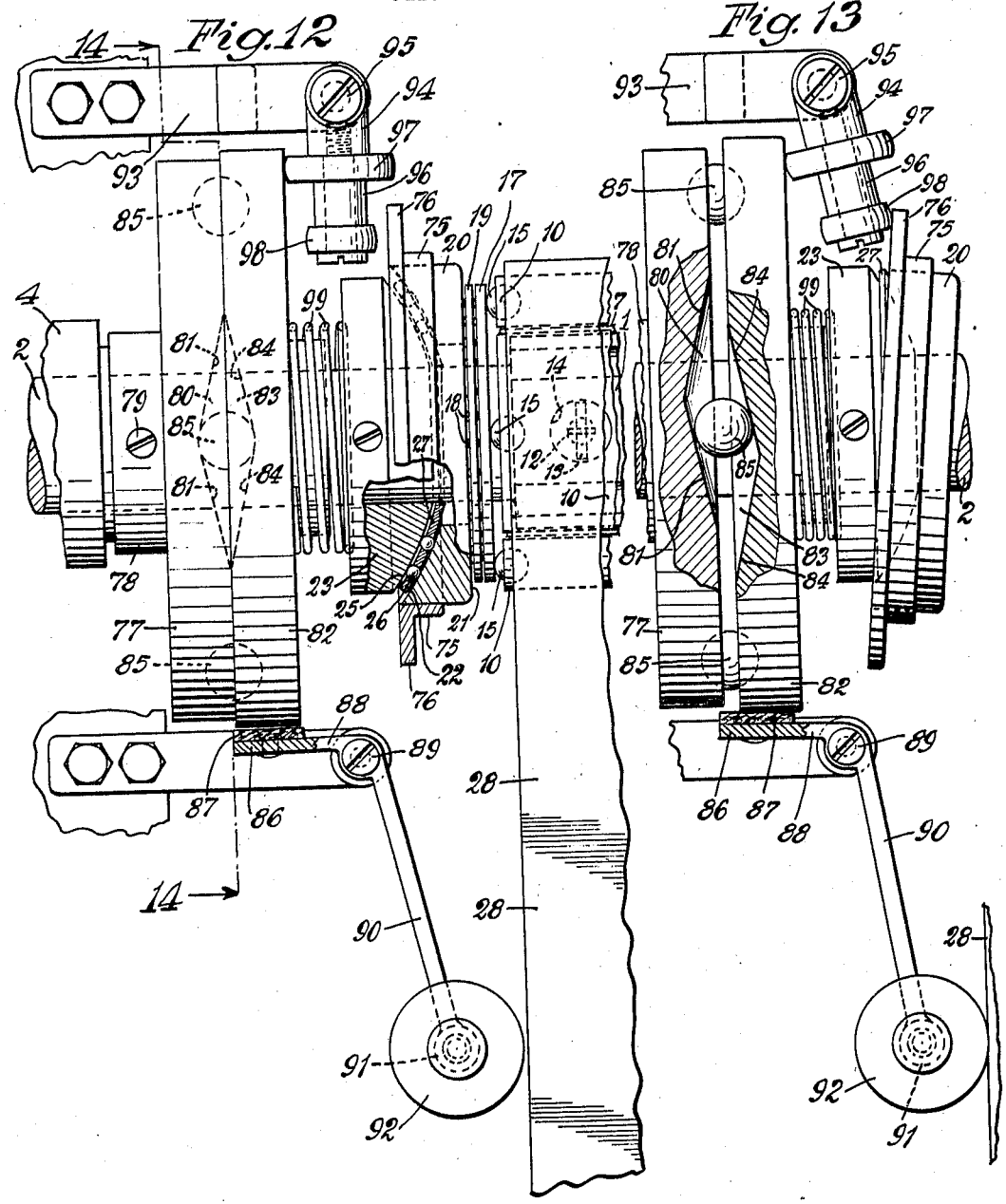
Inventor
Rudolph F. Hlavaty
by Parker & Carter
Attorneys Patented Feb. 29, 1944

2,342,863

UNITED STATES PATENT OFFICE 2,342,863

SELF-ALIGNING PULLEY

Rudolph F. Hlavaty, Cicero, Ill.

Application March 14, 1942, Serial No. 434,651

20 Claims. (Cl. 74—241)

This invention relates to a self-aligning mechanism in which means are provided for maintaining a rotary element in proper alignment with a surface member with respect to which it rotates. In one form it may be embodied in a pulley and belt assembly, and the means are effective to maintain proper alignment ordinarily.

It has for one object, therefore, to provide a self-aligning pulley.

Another object is to provide means whereby a belt is itself effective to maintain proper alignment of the belt with respect to the pulley.

Another object is to provide in a belt and pulley assembly means effected by the belt at a point separated from the pulley to maintain proper alignment.

Another object is to provide mechanical means positioned away from the pulley for actuating realignment means positioned in the pulley.

Other objects will appear from time to time throughout the specification and claims.

The invention is illustrated more or less diagrammatically in the accompanying drawings, wherein:

Figure 1 is a plan view with parts broken away and parts omitted, showing one form of the device.

Figure 2 is a fragmentary plan view of a portion of Figure 1, showing the self-aligning mechanism in operation.

Figure 3 is a side elevation on an enlarged scale with parts in section, showing the self-aligning mechanism.

Figure 4 is a sectional detail taken at line 4—4 of Figure 1 on an enlarged scale.

Figure 5 is a transverse sectional detail taken at line 5—5 of Figure 1.

Figure 6 is a transverse sectional detail taken at line 6—6 of Figure 4.

Figure 7 is a transverse sectional detail with parts omitted, taken on an enlarged scale from end to end of the pulley and illustrating the parts in the position which they occupy when the belt has started to move to a position of misalignment to the left of Figure 7.

Figure 8 is a sectional detail illustrating a modified form of belt contacting member.

Figure 9 is a sectional view illustrating a modified form of means for actuating the pulley realigning mechanism.

Figure 10 is a transverse section taken at line 10—10 of Figure 9.

Figure 11 is a section taken at line 11—11 of Figure 9.

Figure 12 is a plan view with parts broken away and parts in section, illustrating a further modified form of re-aligning means.

Figure 13 is a view generally similar to Figure 12, showing the parts in the position to which they are moved during the re-aligning operation.

Figure 14 is a transverse section taken at line 14—14 of Figure 12.

Like parts are indicated by like characters throughout the specification and the drawings.

In the particular form here shown, the pulley itself comprises a body 1 which may, as indicated particularly in Figure 5, be of substantially rectangular cross section. At each end the pulley is preferably provided with rounded portions 2, 2, which are received in bearings 3, 3 carried in housings 4, 4. The details of the bearings and the bearing housings are unimportant, as the invention is not limited to them. As shown, the pulley body may be perforated as at 5, 5, and the perforations if present preferably extend from one face of the pulley to an opposite face. The pulley is also provided on each side preferably with ball races 6, 6, which as shown are groove-like. Adjacent each face of the pulley body is mounted a carrier or cage 7 in which a plurality of balls or other anti-friction members 8 is mounted. These balls are positioned to run in the grooves or races 6 and to run also in cooperating grooves or races 9 formed on the inner faces of surface members 10 which are arcuate as at 11 on their outer faces. Springs 12 preferably connect oppositely placed surface members and extend through the perforations 5. The springs may be secured to the surface members in any desired manner, but as shown are held by pins 13 in perforations or cavities 14 formed in the respective surface members. At each end, each surface member may be provided with anti-friction means which in the form here shown comprise balls 15 positioned in cavities or pockets 16. These anti-friction members may be omitted if desired. Also if desired the ends of the surface members may be formed themselves to comprise more or less anti-friction members.

Positioned at each end of the pulley assembly to contact the balls 15 or to contact the ends of the surface members directly are washers 17. On their outer faces these washers are in contact with balls 18 which are positioned in a cage or carrier 19. The washer 17 and the carrier 19 are loose on the pulley, both for rotation and for tilting movement with respect to the pulley. Positioned outwardly from the carriers 19 are concave floating wedge members 20. These are preferably provided each with a flat face 21 and a spherical face 22. Positioned to cooperate with the wedge member 20 is a fixed wedge member 23 which is adjustably secured on the shaft portion 2 by a set screw 24. It is provided with a convex face 25. The convex face of the member 23 may contact directly with the concave face of the member 20 or anti-friction bearings may be positioned between them as shown. The particular form of these bearings is immaterial, but as shown balls 26 are positioned in a carrier or cage 27 which for convenience is concavo-convex. The invention is not limited to a pulley made exactly according to the disclosure, and the particular arrangement of surface members is not essential as long as there are surface members which are arranged to contact the belt and to move longitudinally with respect to the pulley assembly.

While the pulley may cooperate with something besides a belt—that is to say, with some other surface or surface forming member—in the particular form here shown it engages a belt 28. The invention may be embodied in an idler pulley or in a driving or driven pulley. As shown herewith in Figure 1, a pinion 29 is secured to one of the shaft portions 2 and may be used to drive the pulley. In any system in wh'ch the self-aligning pulley is used, all of the pulleys may be self-aligning or some may and some may not. As shown in Figure 1, a pulley 30 which is not self-aligning is used. This pulley may be positioned on a shaft 31 supported in bearings 32, and spacing members 33 may be included in the assembly if desired.

The means for operating the self-aligning feature as shown in the first seven figures will now be described. Positioned in contact with each side of the belt is an operating assembly. This comprises a shaft 34 which is supported in bearings 35, 35, which may be carried in supports 36, 36, which are secured to a base member 37. This member is fastened to any desirable support 38 by screws 39 or otherwise. One of the supports 36 may be provided with a lateral extension 40 to which one end 41 of a spring 42 is secured by a screw 43 or otherwise. The opposite end 44 of the spring 42 is positioned in a slot in the shaft 34 or is otherwise secured to the shaft so that rotation of the shaft affects the spring. The purpose of the spring is to yieldingly resist rotation of the shaft and to return the shaft to its original position after rotation has taken place. Fixed on the shaft is a rotor 45 which is preferably provided with an inclined or conical face 46 which may contact the edge of the belt, as shown particularly in Figure 4 in dotted lines. Fixed also on the shaft 34 is a screw 47 which is preferably provided or shaped with a thread of varying pitch, as shown generally in Figures 1 and 2, and particularly in Figure 4. Engaged in the thread of the screw 47 is a member 48 which is mounted in one end of a lever 49. This lever is itself pivoted at 50, and the pivot may be carried by an extension 51 attached to or formed as a part of the bearing housing 4. The lever 49 is provided with an arm or extension 52 which, as shown particularly in Figure 3, extends downwardly as well as outwardly from the pivot. On or near its end is positioned a roller 53, and this roller is in position to contact a wedge member 20. It will be understood that the construction is duplicated on each side of the belt, and a description of one of such assemblies will suffice for both.

The thread of the screw 47 terminates at a closed end or stop 54. Instead of this construction the modified arrangement of Figure 8 may be used. As there shown, a member 55 is secured to the shaft 34 by a pin 56 or otherwise, and a friction disc or surface member 57 is positioned on one side of the disc 55. The belt contacting member 45 with its conical or inclined surface 46 is normally held against the friction disc 57 by a compression spring 58 which under certain circumstances prevents relative rotation of the member 45 with respect to the shaft 34. If sufficient resistance occurs, however, the member 45 can slip and this construction may be used as a precaution against damage to the parts, should the misaligning effect continue too long. It is to be understood, of course, that the thread of the member 47 being limited, it would be possible under certain conditions for the misalignment to be corrected too slowly, and then the member 48 would be carried clear to the end 54 of the thread, and thereafter, if the misalignment were not corrected promptly, the parts might be held in that position and the belt would then drag or scrape over the member 45. However, with the construction of Figure 8, the friction of the belt would be sufficient to overcome the friction of the member 57 and the part 45 could then rotate upon the shaft 34.

In the form of the device shown in Figures 9, 10, and 11 the pulley construction and details are the same as those above described. The re-aligning mechanism is, however, somewhat different. In general, the re-aligning effect is produced by a spring rather than by a lever mechanism, and the spring is released upon the occurrence of misalignment. In this form of the device a yoke-like member 59 is pivoted as at 60 on a portion of the bearing housing 4. A member 61 extends from the yoke 59 and engages one end of a spring 62. An arm 63 extends from the member 61 and carries a roller 64 which is arranged to contact the wedge 20 in the manner in which the roller 53 above described contacts the wedge member 20. A base 65 may be formed as a part of or attached to the bearing housing 4, and it receives the opposite end of the spring 62. Bosses or other means may be provided on the members 61 and 65 to provide seating for the spring and to prevent misplacement. An oppositely directed extension 66 is also formed as a part of or attached to the yoke 59. As shown particularly in Figure 11, this member is provided with a notch or shoulder 67 which engages a corresponding notch or shoulder 68 on a latch member 69 which is mounted for rotation on a bearing or pin 70. A spring 71 bears at one end against the member 69 and at its other end upon a support or base 72, which may be formed as a part of or attached to the bearing housing 4. At its outer or free end the member 69 supports a roller 73, which has a conical or inclined face 74. This roller is similar to the roller 45, 46, described in connection with the preceding form, and is arranged to be contacted by the edge of the belt 28.

Means may be provided for re-latching the members 66 and 69. As shown this comprises a member 100 fixed on the pulley portion 2 and provided with a thread 101 which engages a worm 102 fixed on a shaft 103, upon which a cam 104 is also fixed. The shaft and cam are constantly rotated, and the cam is of such size that it will clear the arm 63 when the latter is in the raised position, so that the roller 64 is out of contact with the member 20, but should the arm 63 be depressed, the cam with each rotation will contact the arm and raise it to the full raised position, thus compressing the spring 62 and moving the member 66 down toward the latching position. If by that time re-alignment has been accomplished, the spring 71 will have raised the arm 69 to a position in which re-latching is accomplished. If, however, re-alignment has not yet been accomplished, the member 69 will still be depressed and re-latching cannot take place.

A still further modified form is illustrated in Figures 12, 13, and 14. In that form the pulley construction is substantially the same as that above described in connection with the two preceding forms, except for the fact that the wedge member 20 has secured to it for convenience of operation a ring 75 from which a lateral flange 76 extends.

The re-alignment operating means of this form of the device is as follows: A disc 77 carried by a collar 78 is secured to the pulley portion 2 by a set screw 79 or otherwise. Formed in one face of the disc 77 are one or more depressions 80 which as shown particularly in Figure 13 have oppositely disposed inclined faces 81, 81.

Loose on the portion 2 is a corresponding disc 82 which has one or more depressions 83 in its face. These are positioned to cooperate with the depressions 80 of the member 77 and are provided with conical bottom portions 84, 84. A ball or other rotary member 85 is positioned in each pair of depressions 80, 83. The outer surface of the disc 82 may be formed as a braking surface to cooperate with a brake shoe 86, to which a braking surface 87 may be applied. The brake shoe is formed upon or attached to a lever 88 which is pivoted at 89. An arm 90 of the lever 88 may be laterally bent, as at 91, as shown in Figure 14, and has mounted on it for rotation a roller 92, which is positioned to be contacted by the edge of the belt under conditions of misalignment.

Positioned upon a support 93, which may be carried from any suitable base, is an arm 94, pivotally supported by a screw 95. A rotary member 96 is mounted on the arm for rotation and carries two engaging portions: one—the portion 97—is adapted to engage and to be rotated by the outer or free face of the disc 82; and the other—member 98—which may be of less diameter than the member 97, is adapted to contact the flange 76, which is secured to the wedge member 20 and to displace it as shown in Figure 13. A spring member 99 may be positioned about the pulley portion 2 and bears at one end against the wedge 23, which is fixed on the portion 2, and at the other end it bears against the movable disc 82. It tends when free to do so to hold the disc in the position shown in Figure 12 but may yield to permit the disc to move away from that position towards the position shown in Figure 13.

It will be realized that whereas I have described and shown a practical and operative embodiment of my invention and the method for carrying it out, nevertheless many changes may be made in the size, shape, number and disposition of parts and in the details and steps of such method without departing from the spirit of my invention. I therefore wish my description and drawings to be taken as in a broad sense illustrative or diagrammatic, rather than as limiting me to my precise showing.

The self-aligning pulley disclosed above may be made of any desired material. For many purposes it will be made of metal, and it may cooperate with a belt or other contact member which is made of any desirable material. The choice of materials both for the various parts of the pulley assembly and for the belt or other contact member will depend upon the use to which the device is to be put and upon the materials which are to be handled or conveyed. While the pulley assembly will generally be of metal, it may be made of almost any other material, such as cement, glass, ceramic materials, plastics, or other materials, and of course the parts may be formed by casting, die-casting, machining, or any other desired manner, and the apparatus may be used for conveying any desired material and can be arranged to operate indoors, outdoors, on heavy materials or light, to handle liquids, solids, acids, hot materials or cold materials. In short, the material of which the various parts of the apparatus shown can be made may be varied as desired, dependent upon the service to which the apparatus is to be put.

The use and operation of the invention are as follows:

In the form of the device shown in the first seven figures, when misalignment occurs the belt contacts or runs up upon the inclined surface 46 of the member 45, and this rotates the shaft 34 and the screw formed in the member 47, thus carrying the lever 49 from the position of Figure 1 to the position of Figure 2. When that occurs the lever 52 is depressed and the roller 53 is pressed against the movable wedge member 20, carrying it to the depressed position of Figure 2. This forces one of the surface members 10 to the right. This operation is shown in detail in Figure 7. When for example one surface member 10 has been forced to the right, this exerts a pressure against the wedge plate 20 and tilts it upwardly from its neutral position, and when that occurs the opposite edge or portion of the member 20 exerts a thrust to the left on the oppositely placed surface member 10. This effect is shown in Figure 7, and thus movement of either of the wedge members accomplishes an opposite movement of the other wedge member, and correspondingly oppositely placed surface members are given opposite movement, and this relationship and movement corrects misalignment. When misalignment has been corrected, the belt moves out of contact with the surface 46, and the spring 42 is free to expand and to return the shaft 34 to its original position, and the wedge members are also restored to their original position. As shown in the several figures and as described, the misalignment is in each case to the left. Obviously it might be in the opposite direction, and identical re-aligning means are positioned at each end of the assembly, and re-alignment is accomplished equally well no matter which side is involved. The realigning effect is accomplished in response to side movement of the belt which is effective to operate the realigning means, and the controlling part of the re-aligning means is positioned away from the pulley assembly and preferably in the direction of movement of the belt toward the pulley, although this arrangement is not essential.

In the form of the device shown in Figures 9, 10, and 11, the pulley and wedge assembly is the same as above described. The thrust or force which is exerted upon the wedge member 20 is, however, not directly effected from the belt. The belt serves merely as an unlatching or releasing means, and the thrust through the arm 63 and the roller 64 is exerted by the spring 62 which is merely released by misalignment of the belt, so that it can expand to exert a thrust which causes the re-aligning effect.

The operation of the form shown in Figures 12, 13, and 14 is in effect a double wedge action. When the disc 82 is stopped or checked by the brake shoe, which is forced into contact with it by misalignment of the belt. The roller or ball 85 rolls up the oppositely placed faces 81 and 84 of the respective depressions 80 and 83 and wedges the disc 82 outwardly, thus moving the member 94 and exerting a pressure against the disc 76 which is fixed to the wedge 20. Since the pulley assembly is the same as illustrated above in detail, the same relative movement of surface members described above occurs when the parts shown in Figure 12 move to the position shown in Figure 13, and when the belt has been properly re-aligned, the brake shoe is lifted and the spring 99 returns the parts to their original position.

I claim:

1. In combination, a pulley and a belt in contact therewith, and means for maintaining them in proper alignment, said means including a plurality of surface members mounted in the pulley for longitudinal movement, a control part mounted adjacent one end of the pulley, said control part adapted to be moved, and when so moved adapted to cause the surface members to move longitudinally, and means for moving said control part in response to belt misalignment, said means including a member positioned adjacent the belt and normally out of contact with it when the belt is properly aligned, and a drive from said member to said control part whereby when the belt moves to contact said last-mentioned member, the control part is moved and moves a surface member to correct misalignment.

2. In combination, a pulley and a belt in contact therewith, and means for maintaining them in proper alignment, said means including a plurality of surface members mounted in the pulley for longitudinal movement, a pair of control parts mounted one adjacent each end of the pulley, said control parts adapted to be moved, and when so moved adapted to cause the surface members to move longitudinally, and means for moving said control parts in response to belt misalignment, said means including a member positioned adjacent the belt and normally out of contact with it when the belt is properly aligned, and a drive from said member to said control part whereby when the belt moves to contact said last-mentioned member, the control part is moved and moves a surface member to correct misalignment.

3. In combination, a pulley and a belt in contact therewith, and means for maintaining them in proper alignment, said means including a plurality of surface members mounted in the pulley for longitudinal movement, a control part mounted adjacent one end of the pulley, said control part adapted to be moved, and when so moved adapted to cause the surface members to move longitudinally, and means for moving said control part in response to belt misalignment, said means including a member positioned adjacent the belt edge and normally out of contact with it when the belt is properly aligned, and a drive from said member to said control part whereby when the belt moves to contact said last-mentioned member, the control part is moved and moves a surface member to correct misalignment.

4. In combination, a pulley and a belt in contact therewith, and means for maintaining them in proper alignment, said means including a plurality of surface members mounted in the pulley for longitudinal movement, a pair of control parts mounted one adjacent each end of the pulley, said control parts adapted to be moved, and when so moved adapted to cause the surface members to move longitudinally, and means for moving said control parts in response to belt misalignment, said means including a member positioned adjacent the belt edge and normally out of contact with it when the belt is properly aligned, and a drive from said member to said control part whereby when the belt moves to contact said last-mentioned member, the control part is moved and moves a surface member to correct misalignment.

5. In combination, a pulley and a belt in contact therewith, and means for maintaining the two in proper alignment with respect to each other, said means including surface members mounted on the pulley for movement longitudinally of the pulley, and a control member positioned adjacent one end of the pulley, said control member adapted when moved to cause longitudinal movement of a pulley surface member, and a belt actuated member positioned adjacent one edge of the belt, and a connection from said belt actuated member to said control members, said belt actuated member, when actuated by the belt during misalignment, being effective to actuate said connection to move its respective control member to cause movement of a pulley surface member in a direction to correct misalignment.

6. In combination, a pulley and a belt in contact therewith, and means for maintaining the two in proper alignment with respect to each other, said means including surface members mounted on the pulley for movement longitudinally of the pulley, and pairs of control members positioned one adjacent each end of the pulley, each pair of control members including a fixed member and a movable member, said movable control member adapted when moved to cause longitudinal movement of a pulley surface member, and a belt actuated member positioned adjacent one edge of the belt, and a connection from said belt actuated member to said movable control members, said belt actuated member, when actuated by the belt during misalignment, being effective to actuate said connection to move its respective movable control member to cause movement of a pulley surface member in a direction to correct misalignment.

7. In combination, a pulley and a belt in contact therewith, and means for maintaining the two in proper alignment with respect to each other, said means including surface members mounted on the pulley for movement longitudinally of the pulley, and a control member positioned adjacent one end of the pulley, said control member adapted when moved to cause longitudinal movement of a pulley surface member, and a belt actuated member positioned adjacent one edge of the belt, and a connection from said belt actuated member to said control members, said belt actuated member, when actuated by the edge of the belt during misalignment, being effective to actuate said connection to move its respective control member to cause movement of a pulley surface member in a direction to correct misalignment.

8. In combination, a pulley and a belt in contact therewith, and means for maintaining the two in proper alignment with respect to each other, said means including surface members mounted on the pulley for movement longitudinally of the pulley, and a control member positioned adjacent one end of the pulley, said control member adapted when moved to cause longitudinal movement of a pulley surface member, and a belt actuated member positioned adjacent one edge of the belt, and a connection from said belt actuated member to said control members, said belt actuated member, when actuated by the belt during misalignment, being effective to actuate said connection to move its respective control member to cause movement of a pulley surface member in a direction to correct misalignment, movement of a pulley surface member under the influence of one control member being effective on the opposite control member to cause a reverse movement of an oppositely placed belt surface member.

9. In combination, a pulley and a belt in contact therewith, and means for maintaining the two in proper alignment with respect to each other, said means including surface members mounted on the pulley for movement longitudinally of the pulley, and a control member positioned adjacent one end of the pulley, said control member adapted when moved to cause longitudinal movement of a pulley surface member, and a belt actuated member positioned adjacent one edge of the belt, and a connection from said belt actuated member to said control members, said belt actuated member, when actuated by the edge of the belt during misalignment, being effective to actuate said connection to move its respective control member to cause movement of a pulley surface member in a direction to correct misalignment, movement of a pulley surface member under the influence of one control member being effective on the opposite control member to cause a reverse movement of an oppositely placed belt surface member.

10. In combination, a pulley and a belt in contact therewith, and means for maintaining the two in proper alignment with respect to each other, said means including surface members mounted on the pulley for movement longitudinally of the pulley, and pairs of control members positioned one adjacent each end of the pulley, each pair of control members including a fixed member and a movable member, said movable control member adapted when moved to cause longitudinal movement of a pulley surface member, and a belt actuated member positioned adjacent one edge of the belt, and a connection from said belt actuated member to said movable control members, said belt actuated member, when actuated by the edge of the belt during misalignment, being effective to actuate said connection to move its respective movable control member to cause movement of a pulley surface member in a direction to correct misalignment.

11. In combination, a pulley and a belt in contact therewith, and means for maintaining the two in proper alignment with respect to each other, said means including surface members mounted on the pulley for movement longitudinally of the pulley, and pairs of control members positioned one adjacent each end of the pulley, said control member adapted when moved to cause longitudinal movement of a pulley surface member, and belt actuated members positioned one adjacent each edge of the belt, and a connection from each of said belt actuated members to one of said control members, said belt actuated member, when actuated by the belt during misalignment, being effective to actuate said connection to move its respective control member to cause movement of a pulley surface member in a direction to correct misalignment.

12. In combination, a pulley and a belt in contact therewith, and means for maintaining the two in proper alignment with respect to each other, said means including surface members mounted on the pulley for movement longitudinally of the pulley, and pairs of control members positioned one adjacent each end of the pulley, each pair of control members including a fixed member and a movable member, said movable control member adapted when moved to cause longitudinal movement of a pulley surface member, and belt actuated members positioned one adjacent each edge of the belt, and a connection from each of said belt actuated members to one of said movable control members, said belt actuated member, when actuated by the belt during misalignment, being effective to actuate said connection to move its respective movable control member to cause movement of a pulley surface member in a direction to correct misalignment.

13. In combination, a pulley and a belt in contact therewith, and means for maintaining the two in proper alignment with respect to each other, said means including surface members mounted on the pulley for movement longitudinally of the pulley, and pairs of control members positioned one adjacent each end of the pulley, said control member adapted when moved to cause longitudinal movement of a pulley surface member, and belt actuated members positioned one adjacent each edge of the belt, and a connection from each of said belt actuated members to one of said control members, said belt actuated member, when actuated by the edge of the belt during misalignment, being effective to actuate said connection to move its respective control member to cause movement of a pulley surface member in a direction to correct misalignment.

14. In combination, a pulley and a belt in contact therewith, and means for maintaining the two in proper alignment with respect to each other, said means including surface members mounted on the pulley for movement longitudinally of the pulley, and pairs of control members positioned one adjacent each end of the pulley, each pair of control members including a fixed member and a movable member, said movable control member adapted when moved to cause longitudinal movement of a pulley surface member, and belt actuated members positioned one adjacent each edge of the belt, and a connection from each of said belt actuated members to one of said movable control members, said belt actuated member, when actuated by the edge of the belt during misalignment, being effective to actuate said connection to move its respective movable control member to cause movement of a pulley surface member in a direction to correct misalignment.

15. In combination, a pulley and a belt in contact therewith, and means for maintaining the two in proper alignment with respect to each other, said means including surface members mounted on the pulley for movement longitudinally of the pulley, and pairs of control members positioned one adjacent each end of the pulley, each pair of control members including a fixed member and a movable member, said movable control member adapted when moved to cause longitudinal movement of a pulley surface member, and belt actuated members positioned one adjacent each edge of the belt, and a connection from each of said belt actuated members to one of said movable control members, said belt actuated member, when actuated by the edge of the belt during misalignment, being effective to actuate said connection to move its respective movable control member to cause movement of a pulley surface member in a direction to correct misalignment, movement of a pulley surface member under the influence of one movable control member being effective on the opposite movable control member to cause a reverse movement of an oppositely placed belt surface member.

16. In combination, a pulley and a belt in contact therewith, and means for maintaining them in proper alignment, said means including a plurality of surface members mounted in the pulley for longitudinal movement, a pair of control parts mounted one adjacent each end of the pulley, said control parts adapted to be moved, and when so moved adapted to cause the surface members to move longitudinally, and means for moving said control parts in response to belt misalignment, said means including a rotary member positioned adjacent the belt edge and normally out of contact with it when the belt is properly aligned, and a drive from said member to said control part whereby when the belt moves to contact said last-mentioned member, the control part is moved and moves a surface member to correct misalignment, said rotary member including a screw, and said drive including a lever positioned to engage said screw and provided with an end positioned to exert pressure upon one of said control parts.

17. In combination, a pulley and a belt in contact therewith, and means for maintaining them in proper alignment, said means including a plurality of surface members mounted in the pulley for longitudinal movement, a pair of control parts mounted one adjacent each end of the pulley, said control parts adapted to be moved, and when so moved adapted to cause the surface members to move longitudinally, and means for moving said control parts in response to belt misalignment, said means including a rotary member positioned adjacent the belt edge and normally out of contact with it when the belt is properly aligned, and a drive from said member to said control part whereby when the belt moves to contact said last-mentioned member, the control part is moved and moves a surface member to correct misalignment, said rotary member including a screw, and said drive including a lever positioned to engage said screw and provided with an end positioned to exert pressure upon one of said control parts, and yielding means tending when free to do so to move said rotary member to its initial position and to hold it yieldingly in that position.

18. In combination, a pulley and a belt in contact therewith, and means for maintaining them in proper alignment, said means including a plurality of surface members mounted in the pulley for longitudinal movement, a pair of control parts mounted one adjacent each end of the pulley, said control parts adapted to be moved, and when so moved adapted to cause the surface members to move longitudinally, and means for moving said control parts in response to belt misalignment, said means including a member positioned adjacent the belt edge and normally out of contact with it when the belt is properly aligned, and a drive from said member to said control part whereby when the belt moves to contact said last-mentioned member, the control part is moved and moves a surface member to correct misalignment, said drive including a pivoted lever provided with a part adapted when free to do so to exert pressure on one of said control members, and with a part adapted to be acted upon by said last-mentioned member upon the occurrence of misalignment.

19. In combination, a pulley having longitudinally movable parts and a belt in contact with said parts, and means for maintaining said belt and pulley in proper alignment, said means including a control part mounted on and adjacent one end of the pulley, said control part adapted to be moved, and when so moved adapted to cause that portion of the pulley with which the belt is in contact to move longitudinally, and means for moving said control part in response to belt misalignment, said means including a member positioned adjacent the belt and normally out of contact with it when the belt is properly aligned, and a drive from said member to said control part whereby the belt moves to contact said last-mentioned member, the control part is moved and moves the belt-contacting portion of the pulley to correct misalignment.

20. In combination, a pulley having longitudinally movable parts and a belt in contact with said parts, and means for maintaining said belt and pulley in proper alignment, said means including a pair of control parts mounted on and adjacent each end of the pulley, said control parts adapted to be moved, and when so moved adapted to cause that portion of the pulley with which the belt is in contact to move longitudinally, and means for moving said control parts in response to belt misalignment, said means including a member positioned adjacent the belt and normally out of contact with it when the belt is properly aligned, and a drive from said member to said control part whereby when the belt moves to contact said last-mentioned member, the control part is moved and moves the belt-contacting portion of the pulley to correct misalignment.

RUDOLPH F. HLAVATY.